June 25, 1968     S. H. RUTHERFORD     3,389,954
VISUAL SIMULATION DEVICES ESPECIALLY FOR
VEHICLE DRIVING TRAINERS
Filed April 30, 1965
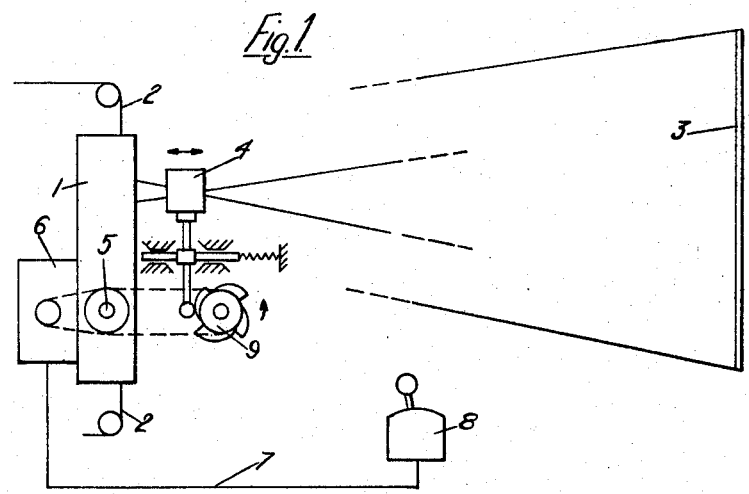
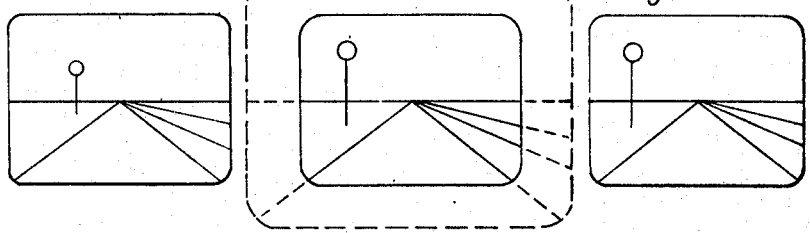
Inventor
STUART HENRY RUTHERFORD United States Patent Office 3,389,954
Patented June 25, 1968

3,389,954
VISUAL SIMULATION DEVICES ESPECIALLY FOR VEHICLE DRIVING TRAINERS
Stuart Henry Rutherford, Aylesbury, England, assignor to Redifon Air Trainers Limited, a British company
Filed Apr. 30, 1965, Ser. No. 452,293
Claims priority, application Great Britain, May 6, 1964, 18,860/64
7 Claims. (Cl. 352—85)

ABSTRACT OF THE DISCLOSURE

Use of a zoom lens in an intermittent film feed optical system with the zoom power cyclically controlled in synchronism with the intermittent film feed to progressively increase the system magnification between first and second values during the dwell time of each frame and then to reset the magnification to the first value as a successive frame is viewed, thereby interpolating between successive frames and allowing the use of very low frame rates without incurring disconcerting jerkiness, and disabling the zoom power adjustment at high frame rates. The system finds particular use in visual displays for locomotive, automobile, aircraft and similar visual displays for training purposes.

---

This invention is concerned with the visual simulation to an observer, by the projection of a cine film, of his supposed travel along a predetermined course through an external scene. It relates in particular to systems for this purpose in which his view is along, not across, the direction of his supposed motion, and in which this motion is liable to appear unacceptably jerky because the frame frequency of projection is unduly low and/or the shift of scene between successive frames in the film in unduly large. This difficulty may be encountered in (for example) a device for training railway locomotive drivers in which the subject views through his windscreen the projection of a cine film of the approaching track and adjoining scenery, and manipulates simulated train controls which regulate his apparent speed (including starting and stopping) by in fact correspondingly regulating the frame frequency at which the projector is running. For convenience, the invention will be described in the context of such a training device, although it will be appreciated that it is applicable over a much wider field than this. Visual display systems for training automobile drivers, aircraft pilots and the like in which a motion picture projector is fed film at a rate commensurate with the apparent speed of a simulated vehicle are well known. See U.S. Pat. No. 2,999,322, for example. Films for use in such projection systems ordinarily are made by moving a motion picture camera over actual terrain at a representative average speed, or by taking a series of equivalent still pictures and joining them in a strip, or by moving a camera relative to a scale model. When such films are later projected in a training device, if they are to realistically depict the speed of the simulated vehicle they must be projected at a frame rate equal to the original camera rate times the ratio between the instantaneous simulated speed of the vehicle and the speed of the camera-carrying vehicle when the pictures were taken. If the trainee operates the training device so as to provide a very low (or zero) simulated speed, the projector frame rate required for realistic simulation will be seen to become very low (or zero). As is well known, most motion picture systems involving successive film frames depend upon persistence of vision, and require that the projector frame rate not fall below approximately 16 frames per second if realism is to be obtained.

When simulated vehicle running speed is in the low part of its range, not only will conventional projector shutter produce unacceptable flicker, but the effect will be of a succession of "still" pictures and apparent motion will be unduly jerky. Flicker can be reduced by known projector mechanisms constructed to achieve "pull-down" or film shift from each frame to the next in a time interval which is uniformly brief whatever the frame frequency of operation, that is to say however long may be the "dwell" of each frame in the projection gate. Flicker can also be substantially eliminated by using mechanism of the shutterless continuous-motion type in which a rotary polygon-prism effects a visual "lap-dissolve" of each frame image into the next without interrupting the light.

However, such mechanisms do not deal with the visual impression of jerky progress at low speeds, and it is the object of the present invention to minimise or substantially eliminate this. For this purpose a film projector according to the invention is of the intermittent-motion type and has added to it optical means for automatically and progressively altering the projection magnification of each film frame, during its period of dwell, to bring its image into substantial correspondence with that due from the next frame. Conveniently, this optical means may comprise what is known as a "zoom" lens coupled to the film drive mechanism for receiving cyclic oscillatory adjustment at the frame frequency.

In the accompanying drawings:
FIGURE 1 is a diagrammatic side view of a projector arrangement according to the invention, here given by way of example only, and
FIGURES 2A, 2A' and 2B show three successive stages in the progress of the projected picture given by the device of FIGURE 1.

The projector (FIGURE 1) comprises essentially a housing 1 containing feed mechanism by which the cine film 2 is moved intermittently through the usual illuminated gate position for each frame picture in turn to be imaged on a viewing screen 3 by a projection lens 4. The input shaft 5 of the feed mechanism is driven by a motor 6 whose speed is regulated through a control connection 7 from a driver's control lever 8. This latter would in practice be included in the driving controls in a simulated locomotive cabin (not shown) from which a driver under training would view the projected film through his windscreen. The mechanism driven by shaft 5 is such that each film frame dwells in the projection gate for a period dependent on the speed at which the drive shaft 5 is running, but the following shift or "pull-down" to bring the next frame into the gate, and the accompanying shutter action, occur uniformly quickly whatever may be the running speed (i.e., frame frequency), right down to zero. Variable-speed film mechanisms providing this are known in the cinematographic art, and detailed illustration of them here is not considered essential to an understanding of the present invention.

This type of projector mechanism avoids objectionable flicker even at very low flame frequencies but, as previously remarked, it will not deal with the visual impression of jumps in the observer's position if a film of a moving scene is being projected at such frequencies. The present invention contemplates the use (for example) of film taken by a cine camera looking forward from the driver's position in a railway locomotive, the arrangement being such that one film frame is exposed for each foot of advance of the locomotive. At the more usual film projection speeds of the order of 16 frames per second (11 m.p.h.) and upwards, the film can give an adequate impression of progressive forward motion of the observer, but at lower frame frequencies the jump in the viewpoint at each successive frame will be evident and spoil the illusion.

According to the invention that is avoided by making the lens 4 of the "zoom" type and causing repetitive automatic adjustment of it to vary progressively the projection magnification of each frame during its dwell in the gate. The three diagrams in FIGURE 2 show the effect of doing this in relation to two successive frames A and B, the scene being illustrated as a double railway track extending ahead of the observer, with a trackside signal approaching in the relative foreground. It will be evident that if, while frame A is in the gate, its image on the screen is progressively enlarged by about 50%, the result indicated in FIGURE 2A' will be smoothly reached: however, if the effective screen size remains unchanged (for example if it is of fixed dimensions or has the conventional black border) the features shown dotted in FIGURE 2A' will pass out of the visible picture and the end result will correspond closely to the picture in the next frame of the film. At this point the projector mechanism shifts the next frame into the projection gate, and as this occurs the lens 4 is returned sharply to its initial setting, so that the picture of FIGURE 2B appears on the screen. Since this corresponds closely with 2A', a sudden jump in apparent viewpoint between frames A and B has been avoided.

A picture expansion of about 50% has been used in the drawings to make the effect readily appreciated, but in practice for less than this will normally be used. In a particular locomotive driving trainer using the invention, an advance of one foot is simulated by enlarging each frame image by only about 2%, and a zoom lens required to operate only over this range can be of a relatively simple and robust type.

In FIGURE 1 the requisite operation of the lens 4 has been illustrated for simplicity as effected by a rotary cam 9 with sawtooth lobes; it will be understood that the cam lobes will be shaped to give the appropriate "law," and that the cam itself will be coupled (as indicated at 11) to the projector mechanism to operate in synchronism and proper phase relation with the latter. Provision may be made for operation of the zoom feature to tail off or discontinue when projector speed rises into the range where visual jerkiness would in any case be no longer apparent. In the arrangement illustrated, this could be done by elongating the cam member 9 axially and progressively grading its shape towards the cylindrical, so that on sliding it axially by a connection from the speed control link 7 it would be rendered temporarily ineffective as regards applying motion to the lens 4.

Since the operation of a zoom lens in this projector system will vary the brightness of the image, an iris diaphragm may be included in the lens assembly and arranged to be affected by the cyclic adjustment of this latter in the sense to offset this brightness variation. However, the 2% range of magnification change referred to gives rise to a theoretical brightness variation of only approximately 4%, and this has not been found to be evident enough to justify such an addition.

Where the invention is applied to a projector using the shutterless polygon-prism principle above referred to, it will be appreciated that the latter must likewise be given the intermittent type of motion a low speeds, since the invention requires that only one frame at a time is projected when the zoom lens is in operation. However, the mechanism may be arranged to revert to a steady-running mode when speed rises into the higher range, with advantages as regards lack of noise and wear on mechanism and film at high speeds.

Whilst the invention has hitherto been described with reference to cine projectors, it is applicable to other forms of device for viewing cine films, including for example those including television scanning systems. Consideration will also show that the principle of the invention may with advantage be applied to the original taking of a film of the kind described with reference to FIGURE 2. In this application a zoom lens in the camera may so operate as, during the exposure period of each film frame, progressively to shrink the image slightly and offest the blurring effect of the forward shift of the camera during that period, so improving the definition of foreground features in the picture.

I claim:

1. Optical projection apparatus, comprising, in combination: an optical system including variable magnification means; intermittent-motion film feed means for successively positioning successive single frames of a motion-picture film to be viewed by said optical system; and means for synchronizing said variable magnification means with said film feed means to vary the power of said variable magnification means progressively between a first value and a second value while each one of said frames is being viewed by said optical system and to reset said power to said first value as a successive frame is positioned to be viewed by said optical system.

2. Apparatus according to claim 1 in which said variable magnification means comprises a zoom lens mechanically coupled to said film feed means to be cyclically adjusted at the frame frequency of said film feed means.

3. Apparatus according to claim 1 including variable speed drive means for driving said intermittent film feed means at different speeds to provide different film feed frame rates.

4. Apparatus according to claim 1 in which said optical system comprises a projection system having a projection screen.

5. Apparatus according to claim 1 in which said optical system comprises a camera.

6. Apparatus according to claim 3 having means for disabling said synchronizing means at selected high film feed frame rates.

7. Apparatus according to claim 3 in which said optical system comprises a projection system having a projection screen visible from a student's station and in which said variable speed drive means is connected to be controlled from said student's station.

References Cited

UNITED STATES PATENTS

| | | | |
|---|---|---|---|
| 2,022,454 | 11/1935 | Barnes | 352—86 |
| 2,387,546 | 10/1945 | Walker | 352—86 |
| 3,168,743 | 2/1965 | Nesson | 352—180 |
| 3,209,367 | 9/1965 | Heden | 352—140 |

JULIA E. COINER, *Primary Examiner.*